United States Patent
Tahon et al.

(10) Patent No.: US 9,556,331 B2
(45) Date of Patent: Jan. 31, 2017

(54) RUBBER COMPOSITION CONTAINING PRE-HYDROPHOBATED SILICA WITH ZINC SALT FATTY ACID PROCESSING AID AND TIRE WITH TREAD

(71) Applicant: The Goodyear Tire & Rubber Company, Akron, OH (US)

(72) Inventors: Julia Martine Francoise Claudine Tahon, Reckange (LU); Wolfgang Karl Maegerle, Erlensee (DE); Timo Benjamin Korfmann, Mainz (DE); Miriam Laackmann, Frankfurt am Main (DE)

(73) Assignee: The Goodyear Tire & Rubber Company, Akron, OH (US)

(*) Notice: Subject to any disclaimer, the term of this patent is extended or adjusted under 35 U.S.C. 154(b) by 0 days.

(21) Appl. No.: 14/963,326

(22) Filed: Dec. 9, 2015

(65) Prior Publication Data

US 2016/0168367 A1     Jun. 16, 2016

Related U.S. Application Data

(60) Provisional application No. 62/092,294, filed on Dec. 16, 2014.

(51) Int. Cl.
| | | |
|---|---|---|
| *C08K 3/36* | (2006.01) | |
| *C08L 19/00* | (2006.01) | |
| *B60C 1/00* | (2006.01) | |
| *C08K 3/04* | (2006.01) | |

(52) U.S. Cl.
CPC .............. *C08L 19/006* (2013.01); *B60C 1/00* (2013.01); *C08K 3/04* (2013.01); *C08K 3/36* (2013.01); *C08L 2205/025* (2013.01); *C08L 2205/035* (2013.01)

(58) Field of Classification Search
CPC ............ C08L 19/006; C08K 3/04; C08K 3/36
See application file for complete search history.

(56) References Cited

U.S. PATENT DOCUMENTS

| | | | |
|---|---|---|---|
| 7,259,205 B1 | 8/2007 | Pagliarini et al. | |
| 8,247,487 B2 * | 8/2012 | Bethea .................. | B60C 1/0016 523/157 |
| 8,312,905 B2 | 11/2012 | Steiner et al. | |
| 2007/0185267 A1 * | 8/2007 | Kobayashi ............ | B60C 1/0016 525/191 |
| 2012/0123017 A1 * | 5/2012 | Bethea .................. | B60C 1/0016 523/157 |
| 2013/0338256 A1 | 12/2013 | Steiner et al. | |
| 2016/0082774 A1 * | 3/2016 | Zhao .................... | B60C 1/0016 152/153 |

FOREIGN PATENT DOCUMENTS

EP     2289712 A1     3/2011

OTHER PUBLICATIONS

EPO Search Report received by Applicant on May 11, 2016.

* cited by examiner

*Primary Examiner* — Margaret Moore
(74) *Attorney, Agent, or Firm* — Henry C. Young, Jr.

(57) ABSTRACT

The invention relates to rubber compositions containing at least one diene-based elastomer containing dual functionalized styrene/butadiene elastomers and filler reinforcement for the elastomer(s) comprised of pre-hydrophobated precipitated silica together with processing aid for the pretreated precipitated silica comprised of zinc salt of fatty acids. The invention further relates to a pneumatic tire with tread comprised of such.

19 Claims, No Drawings

RUBBER COMPOSITION CONTAINING PRE-HYDROPHOBATED SILICA WITH ZINC SALT FATTY ACID PROCESSING AID AND TIRE WITH TREAD

FIELD OF THE INVENTION

The invention relates to rubber compositions containing at least one diene-based elastomer containing dual functionalized styrene/butadiene elastomers and filler reinforcement for the elastomer(s) comprised of pre-hydrophobated precipitated silica together with a processing aid for the pretreated precipitated silica comprised of zinc salt of fatty acids. The invention further relates to a pneumatic tire with tread comprised of such rubber composition.

BACKGROUND OF THE INVENTION

Various diene-based elastomers may be prepared, for example, by blending the elastomer(s) with rubber reinforcing filler such as rubber reinforcing carbon black and silica reinforcement, particularly precipitated silica reinforcement, together with a silica coupling agent comprised of a bis(3-triethoxysilylpropyl)polysulfide or an organoalkoxymercaptosilane to aid in coupling the silica to the elastomer and enhancing its rubber reinforcing effect. Preparation of such rubber compositions are well known to those having skill in such art.

In an alternative embodiment, the precipitated silica reinforcement may be provided as a pre-hydrophobated precipitated silica which has been hydrophobated by reaction with the silica coupling agent prior to its addition to the rubber composition. The precipitated silica itself is somewhat hydrophilic which therefore tends to attracted more to itself (resulting in the silica particles tending to agglomerate together) rather than to disperse within elastomers in which it is desired to provide reinforcement.

Pre-treatment by pre-hydrophobating the precipitated silica by reaction of hydroxyl groups (e.g. silanol groups) on the precipitated silica with at least one of organoalkoxymercaptosilane and bis(3-alkoxysilylalkyl)polysulfide tends to hydrophobate the precipitated silica to provide a polarity more readily dispersible within the diene rubber containing rubber composition. Further, addition of such organoalkoxymercaptosilane and bis(3-alkoxysilylalkyl)polysulfide silica coupling agents to the rubber composition to promote coupling of the precipitated silica to diene-based elastomers in the rubber composition might not be needed unless otherwise desired.

However, although the mechanism may not be completely understood, relatively high loadings of the rubber composition with such pre-hydrophobated (pre-silica coupler treated) precipitated silica can significantly increase the sulfur cure-rate of the rubber composition to an extent of promoting disadvantageously pre-curing of the rubber composition which is sometimes referred to as scorching. Perhaps the increased cure rate might be associated with, or at least partially a result of, a reduced salinization occurring due to absence of ethanol byproduct in the pre-hydrophobated precipitated silica used for the experiments.

Therefore it is proposed to evaluate counterbalancing such apparently induced increased rubber cure rate by addition of a processing aid comprised of a pre-formed zinc fatty acid soap with such pre-hydrophobated precipitated silica to the rubber composition to therefore reduce the fast cure promotion by use of the pre-hydrophobated silica.

It is recognized that the rubber composition is normally compounded with a combination of zinc oxide and fatty acids (e.g. comprised of a combination of stearic, palmitic and oleic acids) which form a zinc salt of the fatty acids in situ within the rubber mixture as it is being mixed.

However, for this invention, is proposed to evaluate the addition of a pre-formed zinc salt of fatty acid(s) with the pre-hydrophobated precipitated silica to the rubber composition without adding, or minimalizing addition of, zinc oxide to the rubber composition and thereby waiting for an in situ formation of zinc salt of fatty acids during a mixing of a small amount of zinc oxide and fatty acids with the rubber composition A benefit of inclusion of precipitated silica reinforcing filler in a tire tread rubber composition, including inclusion of precipitated silica having been pre-hydrophobated by pre-reaction with the silica coupler in a tire tread rubber composition, is to normally promote a beneficially lower rolling resistance for a tire tread comprised of the cured rubber composition and thereby a beneficially increased fuel economy for an associated vehicle. An indication of predictive beneficial reduction in tire tread rolling resistance is an increase in rebound property of the rubber composition as well as a decrease in its tangent delta at low strain (low dynamic elongation) which are properties well known to those having skill in such art.

However, it is anticipated by such addition of pre-formed zinc fatty acid salt to the pre-hydrophobated silica-containing rubber composition can promote a disadvantageously reduced increase in the rubber composition's rebound property and a disadvantageously less reduction in its tangent delta at low strain property and therefore a disadvantageously less predictive reduction in rolling resistance for a tire tread of such rubber composition.

Therefore, it is further desired to provide a rubber composition to accommodate such combination of pre-hydrophobated silica and pre-formed zinc salt of fatty acid(s) addition to the rubber composition.

For such rubber composition, it is proposed to provide two functionalized styrene/butadiene elastomers in the rubber composition with functional groups reactive with hydroxyl groups contained on the pre-hydrophobated precipitated silica. Representative of such functional styrene/butadiene elastomers is a first styrene/butadiene elastomer containing a combination of siloxy and amine groups and a second styrene/butadiene elastomer containing a combination of siloxy and thiol groups.

In the description of this invention, the terms "rubber", "elastomer" and "rubbery polymer" may be used interchangeably unless otherwise indicated. The terms "cured" and "vulcanized" may be used interchangeably unless otherwise indicated.

The term "phr" refers to parts by weight of an ingredient per 100 parts by weight of rubber in a rubber composition.

Such terms are known to those having skill in such art.

SUMMARY AND PRACTICE OF THE INVENTION

In accordance with this invention, a tire is provided having a tread of a rubber comprised of, based on parts by weight per 100 parts by weight rubber (phr):
 (A) 100 phr of at least one conjugated diene-based elastomer which includes:
  (1) about 20 to about 100 phr of functionalized styrene/butadiene elastomer derived from organic solvent solution polymerization of styrene and 1,3-butadiene which contains about 10 to about 50, alternately from about 30 to about 40, percent bound styrene and a vinyl 1,2-content based on its butadiene component in a range of from about 10 to about 70, alternately from about 22 to about 45, percent, comprised of:
   (a) about 10 to about 50 phr of a first functionalized styrene/butadiene elastomer containing functional groups comprised of siloxy and amine groups reactive with hydroxyl groups on said pre-hydrophobated precipitated silica, and
   (b) about 10 to about 50 phr of a second functionalized styrene/butadiene elastomer containing functional groups comprised of siloxy and thiol groups reactive with hydroxyl groups on said pre-hydrophobated precipitated silica, and
(2) from about 8 to about 35, alternately from about 8 to about 12, phr of cis 1,4-polybutadiene,
(3) from about 8 to about 35, alternately from about 8 to about 12, phr of 3,4-polyisoprene,
(4) optionally from about 10 to about 30, alternately about 15 to about 20 phr of cis 1,4-polyisoprene,
(B) about 10 to about 170, alternately from about 78 to about 120, phr of particulate reinforcing filler comprised of a combination of pre-hydrophobated precipitated silica (synthetic amorphous precipitated silica) and less than about 12, alternately in a range of from about 2 to about 6, phr, of rubber reinforcing carbon black, where said precipitated silica is pre-hydrophobated by reaction with at least one of alkoxyorganomercaptosilane and bis(3-triethoxysilylpropyl)polysulfide having an average of from about 2 to about 4 connecting sulfur atoms in its polysulfidic bridge,
(C) about 0.1 to about 10, alternately about 2 to about 5, phr of pre-formed zinc salt of fatty acid soap (e.g. soap comprised of aliphatic fatty acids where such fatty acids may be comprised of, for example, at least one of palmitic, stearic and oleic acids), desirably exclusive of zinc oxide or, alternatively from about 1 to about 3 phr of zinc oxide.

In one embodiment, said 3,4-polyisoprene rubber has a microstructure comprised of about 50 to about 70 percent isomeric 3,4-polyisoprene, about 30 to about 40 percent of isomeric cis 1,4-isoprene and about 5 to about 10 percent isomeric vinyl1,2-isoprene.

In one embodiment, the diene-based elastomers further include at least one additional elastomer comprised of at least one polymer of at least one of isoprene and 1,3-butadiene and styrene with at least one of isoprene and 1,3-butadiene wherein, optionally at least one of said additional diene-based elastomers may be end-chain or in-chain functionalized with at least one functional group comprised of siloxy and at least one of amine and thiol groups and, optionally, wherein at least one of additional diene-based elastomers may be tin or silicon coupled.

Representative of said organoalkoxymercaptosilanes are, for example and not intended to be limiting, triethoxy mercaptopropyl silane, trimethoxy mercaptopropyl silane, methyl dimethoxy mercaptopropyl silane, methyl diethoxy mercaptopropyl silane, dimethyl methoxy mercaptopropyl silane, triethoxy mercaptoethyl silane and tripropoxy mercaptopropyl silane.

The invention is further comprised of the aforesaid tire as a sulfur cured rubber tire.

A significant aspect of the invention is a combination of reduction or elimination of addition of zinc oxide to the rubber composition by use of a preformed zinc based soap of dicarboxylic acids instead of adding zinc oxide and fatty acids to allow the zinc oxide to form a zinc/fatty acid product in situ within the rubber composition, use of pre-hydrophobated precipitated silica as filler reinforcement for the rubber composition, use of a combination of two different functionalized styrene/butadiene elastomers and use of only a minimal amount of rubber reinforcing carbon black.

In one embodiment, at least one of the functionalized or non-functionalized elastomers (e.g. styrene/butadiene elastomers) may be tin and/or silicon coupled, preferably tin coupled, as diene-based elastomers prepared by organic solvent polymerization of monomers in the presence of a suitable tin-based catalyst complex. The preparation of tin and silicon coupled elastomers via organic solvent polymerization is well known to those having skill in such art.

In one embodiment, at least one of said functionalized styrene/butadiene rubber is comprised of an in-chain functionalization or end chain (terminated) functionalization with functional groups reactive with hydroxyl groups contained on the precipitated silica and hydrophobated precipitated silica comprised of siloxy and at least one of amine and thiol groups.

It should readily be understood by one having skill in the art that said rubber composition can be compounded by methods generally known in the rubber compounding art, such as mixing the various sulfur-vulcanizable constituent diene-based elastomers with various commonly used additive materials such as, for example, curing aids, such as sulfur, activators, retarders and accelerators, processing additives, such as oils, resins including tackifying resins, plasticizers, fillers, pigments, zinc oxide, waxes, antioxidants and antiozonants, peptizing agents and the aforesaid reinforcing fillers as rubber reinforcing carbon black and precipitated silica. As known to those skilled in the art, depending on the intended use of the sulfur-vulcanizable and sulfur-vulcanized materials (rubbers), the various additives mentioned above are selected and commonly used in conventional amounts unless otherwise indicated herein.

The pneumatic tires are conventionally comprised of a generally toroidal-shaped carcass with an outer circumferential tread, adapted to be ground contacting, spaced beads and sidewalls extending radially from and connecting said tread to said beads.

Typical amounts of antioxidants may comprise, for example, 1 to about 5 phr. Representative antioxidants may be, for example, diphenyl-p-phenylenediamine and others, such as those disclosed in *The Vanderbilt Rubber Handbook* (1978), Pages 344 through 346. Suitable antiozonant(s) and waxes, particularly microcrystalline waxes, where used, may, for example, be of the type shown in *The Vanderbilt Rubber Handbook* (1978), Pages 346 and 347. Typical amounts of antiozonants where used, may, for example, comprise 1 to about 5 phr. Typical amounts of zinc oxide may, for example, comprise from 2 to about 5 phr. Typical amounts of waxes, where used, may comprise, for example, from 1 to about 5 phr. Typical amounts of peptizers, where used, may, for example, comprise from 0.1 to about 1 phr. The presence and relative amounts of the above additives are not normally considered herein as a significant aspect of the present invention.

The vulcanization of the elastomer composition is conducted in the presence of a sulfur-vulcanizing agent. Examples of suitable sulfur-vulcanizing agents include elemental sulfur (free sulfur) or sulfur-donating vulcanizing agents, for example, an amine disulfide, polymeric polysulfide or sulfur olefin adducts. Preferably, the sulfur-vulcanizing agent is elemental sulfur. Such sulfur vulcanizing agents may normally used are used, for example, in an amount ranging from about 0.5 to about 5 phr with a range of from 1.5 to 2.3 being often preferred.

Accelerators are used to control the time and/or temperature required for vulcanization and to improve the properties of the vulcanizate. In one embodiment, a single accelerator system may be used, i.e., primary accelerator. Conventionally, a primary accelerator is used in amounts ranging from, for example, about 0.5 to about 2 phr. In another embodiment, combinations of two or more accelerators might be used, if desired and where appropriate, in which a primary accelerator is might be used in the larger amount of, for example, from 0.5 to 1 phr, and a secondary accelerator which might be used in smaller amounts, for example, from 0.05 to 50 phr, in order to activate the sulfur vulcanization process. Combinations of such accelerators have historically been sometimes known to produce a synergistic effect of the final properties of sulfur-cured rubbers and are sometimes somewhat better than those produced by use of either accelerator alone. In addition, delayed action accelerators may be used, where appropriate which are less affected by normal processing temperatures but might produce satisfactory cures at ordinary vulcanization temperatures. Representative examples of accelerators include, for example, various amines, disulfides, diphenyl guanidine, thioureas, thiazoles, thiurams, sulfenamides, dithiocarbamates and xanthates, particularly diphenyl guanidine. The primary accelerator might be, for example, a sulfenamide such as, for example, N-cyclohexyl-2-sulfenamide. If a second accelerator is used, the secondary accelerator might be selected from, for example, the diphenyl guanidine, a dithiocarbamate or a thiuram compound.

The tire can be built, shaped, molded and cured by various methods which will be readily apparent to those having skill in the art.

Such unvulcanized tread rubber composition (e.g. in a form of an extruded rubber strip) can be applied in the building of the green (unvulcanized) rubber tire in which the uncured, shaped tread is built onto the carcass following which the green tire is shaped and cured.

Alternately, an unvulcanized, or partially vulcanized, tread rubber strip can be applied to a cured tire carcass from which the previous tread has been buffed or abraded away and the tread cured thereon as a retread.

The practice of this invention is further illustrated by reference to the following examples which are intended to be representative rather than restrictive of the scope of the invention. Unless otherwise indicated, all parts and percentages are by weight.

EXAMPLE I

Evaluation of an addition of a pre-formed zinc salt of a fatty acid soap (e.g. zinc salt of potassium fatty acid soap) is proposed for a diene elastomer containing rubber composition with a significant content of pre-hydrophobated precipitated silica reinforcing filler where the rubber composition contains two functionalized styrene/butadiene elastomers. For the evaluation, rubber Samples A through D were prepared.

Control rubber Sample A contained a functionalized SBR and did not contain a pre-formed zinc salt of potassium soap.

Experimental (Intermediate) rubber Sample C contained two functionalized styrene/butadiene rubber's (SBR's) and 3,4-polyisoprene.

Experimental (Intermediate) rubber Sample D was similar to rubber Sample C except that it also contained a pre-hydrophobated precipitated silica.

Experimental rubber Sample B was similar to rubber Sample C except that it contained the pre-formed zinc salt of fatty acid soap.

Table 1 presents the basic ingredients for the rubber Samples. The parts and percentages are by weight unless otherwise indicated.

TABLE 1

| First Non-Productive Mixing Step (NP) - Mixed to 160° C. | Parts (phr) |
|---|---|
| Styrene/butadiene rubber (SSBR)[1] | 40 and 0 |
| Functionalized styrene/butadiene rubber A[2-A] | 50 and 35 |
| Functionalized styrene/butadiene rubber B[2-B] | 0 and 40 |
| Cis 1,4-polybutadiene rubber[3] | 10 |
| 3,4-polyisoprene rubber[4] | 0 and 15 |
| Carbon black, rubber reinforcing[5] | 5 |
| Precipitated silica (non-functionalized)[6] | 106 and 0 |
| Coupling agent/carbon black composite for the precipitated silica[7] | 10.6 and 0 |
| Pre-hydrophobated precipitated silica[8] | 0 and 105 |
| Zinc salt of fatty acid soap[9] | 0 and 4 |
| Antioxidant(s) | 4.8 |
| Zinc oxide | 2.5 and 1 |
| Productive Mixing Step (PR)-Mixed to 110° C. | |
| Sulfur | 3 and 1 |
| Sulfur vulcanization accelerator(s)[10] | 6 and 3.6 |

[1]Organic solvent polymerization prepared styrene/butadiene rubber having a bound styrene content of about 34 percent and vinyl 1,2-content based on its polybutadiene portion of about 58 percent, as Tufdene E680 ™ from Asahi Kasei
[2-A]Functionalized organic solvent polymerization prepared styrene/butadiene rubber having a bound styrene content of about 40 percent and vinyl 1,2-content based on its polybuladiene portion of about 14 percent and containing functional groups comprised of at least one of siloxane and siloxane/thiol groups as Sprintan SLR6430 ™ from Styron.
[2-B]Functionalized organic solvent polymerization prepared styrene/butadience rubber having a bound styrene content of about 32 percent and vinyl 1,2-content based on its polybuladiene portion of about 25 percent and containing functional groups comprised of siloxane and amine groups as HPR650ED ™ from JSR
[3]High cis 1,4-polybutadiene rubber as BUD 1207 from The Goodyear Tire and Rubber Company
[4]3,4-polyisoprene having a microstructure comprised of an isometric content of 60 percent of 3,4- content, 33 percent of trans 1,4- content and 7 percent of vinyl 1,2-content from the Karbochem Company
[5]Rubber reinforcing carbon black as N191, an ASTM designation
[6]Precipitated silica as Premium 200MP ™ from the Solvay Company
[7]Composite of silica coupling agent carbon black carrier in a 50/50 weight ratio where the silica coupling agent is comprised of a bis(3-triethoxysilylpropyl) polysulfide having an average of from about 2 to about 2.6 connecting sulfur atoms in its polysulfidic bridge as Si266 from Evonik
[8]Precipitated silica pre-hydrophobated with an alkoxyorganomercaptosilane as Agilon400D ™ from PPG
[9]Zinc salt of potassium fatty acid soap as Struktol HT-2761 from the Schill and Seilacher Company
[10]Sulfenamide and diphenyl guanidine sulfur vulcanization accelerators Various physical properties of Control rubber Sample A and Experimental rubber Sample B are presented in Table 2 and reported in parts and percentages by weight (e.g. parts by weight per 100 parts by weight rubber, or phr) unless otherwise indicated. Only storage modulus and tan delta properties are reported for rubber Samples C and D.

TABLE 2

| | Rubber Compositions (phr) | | | |
|---|---|---|---|---|
| | Control | | Experimental | |
| Ingredients | A | C | D | B |
| Styrene/butadiene rubber (SSBR) | 40 | 0 | 0 | 0 |
| Functionalized styrene/butadiene rubber A | 50 | 35 | 35 | 35 |
| Functionalized styrene/butadiene rubber B | 0 | 40 | 40 | 40 |
| Polybutadiene rubber | 10 | 10 | 10 | 10 |
| 3,4-polyisoprene rubber | 0 | 15 | 15 | 15 |
| Zinc salt of fatty acid soap | 0 | 0 | 0 | 4 |
| Precipitated silica | 106 | 106 | 0 | 0 |
| Silica coupling agent | 10.6 | 10.6 | 0 | 0 |

TABLE 2-continued

| | Rubber Compositions (phr) | | | |
|---|---|---|---|---|
| | Control | | Experimental | |
| Ingredients | A | C | D | B |
| Pre-hydrophobated precipitated silica | 0 | 0 | 105 | 105 |
| Physical Properties | | | | |
| RPA (Rubber Process Analyzer) test (15% dynamic strain, 0.83 Hertz, 100° C.) | | | | |
| Uncured dynamic storage modulus G' (KPa) | 297 | 529 | 431 | 293 |
| RPA[1],100° C., 10% strain, (cured at 150° C. for 30 minutes) | | | | |
| Dynamic storage modulus G' (MPa) | 2.1 | 2.7 | 1.8 | 1.4 |
| Tan delta | 0.158 | 0.187 | 0.212 | 0.161 |
| ATS[2] (cured at 150° C. for 32 minutes) | | | | |
| Tensile strength (MPa) | 16.3 | — | — | 11.3 |
| Elongation at break (%) | 547 | — | — | 542 |
| 300% modulus, ring, (MPa) | 8.9 | — | — | 6.8 |
| Rebound | | | | |
| 0° C. | 7.1 | — | — | 6.1 |
| 100° C. | 55 | — | — | 58 |
| Shore A Hardness | | | | |
| 23° C. | 67 | — | — | 66 |

[1]RPA: Rubber Process Analyzer
[2]ATS: tensile/elongation test system apparatus It can be seen from Table 2 that the rebound value of Experimental rubber Sample B at 100° C. which contained the inclusion of the zinc salt of potassium salt, pre-hydrophobated precipitated silica instead of precipitated silica together with a combination of two functionalized styrene/butadiene elastomers (functionalized SBR's) is similar, although somewhat higher, than for Control rubber Sample A.

This is considered as being beneficial in a sense that this is predictive of a tire with tread of such rubber composition which may have a somewhat lower rolling resistance and an associated vehicle thereby presenting a somewhat better fuel economy.

It can also be seen from Table 2 that the rebound value at 0° C. of Experimental rubber Sample B was significantly reduced as compared to Control rubber Sample A.

This is considered as being significant in a sense that this is predictive of a tire with tread of such rubber composition having better wet traction and an associated vehicle thereby presenting better wet braking.

It can further be seen from Table 2 that the uncured dynamic storage modulii G' was similar for the Experimental Sample B and Control rubber Sample A indicating similar rubber processing characteristics of the uncured rubber compositions.

The "intermediate" experimental uncured rubber Samples C and D exhibited higher uncured dynamic storage modulii of 529 kPa for rubber Sample C and 431 kPa for rubber Sample D compared to a value of 297 kPa for the Control rubber A. These higher values of uncured storage modulii (G') illustrate the difficulty of processing of rubber Samples C and D which would be expected if no pre-formed zinc salt of potassium soap would be added.

However, although the cured dynamic storage modulus G', the tensile strength and 300 percent modulus of experimental rubber Sample B containing the inclusion of the pre-formed zinc salt of fatty acid soap were reduced, its hardness property was similar to Control rubber Sample A for which the zinc salt of fatty acid soap was not added.

The "intermediate" Experimental rubber Samples C and D exhibited higher cured dynamic storage moduli of 2.7 MPa for rubber Sample C and a lower value of 1.8 MPa for rubber Sample D compared to a value of 2.1 for the Control rubber A.

The above values of G', combined with somewhat similar tangent delta values for the rubber Samples A and B, illustrate that the pre-hydrophobated precipitated silica-containing rubber present a similar beneficial predictive dry traction.

It is concluded that a vehicular pneumatic tire with a tread comprised of rubber composition B of Table 2 containing the zinc salt of fatty acid soap combined with the pre-hydrophobated precipitated silica and two functionalized SBR's would predictably present a beneficially relatively low rolling resistance combined with beneficial wet and dry road tractions.

It is further concluded that the addition of the zinc salt of potassium soap to the pre-hydrophobated precipitated silica-containing rubber composition aids in promoting good processability of the rubber composition.

While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A tire having a tread of a rubber comprised of, based on parts by weight per 100 parts by weight rubber (phr):
   (A) 100 phr of at least one conjugated diene-based elastomer which includes:
       (1) about 20 to about 100 phr of functionalized styrene/butadiene elastomer derived from organic solvent solution polymerization of styrene and 1,3-butadiene monomers which contains about 10 to about 50 percent bound styrene and having a vinyl 1,2-content based on its butadiene component in a range of from about 10 to about 70 percent, comprised of:
           (a) about 10 to about 50 phr of a first functionalized styrene/butadiene elastomer containing functional groups comprised of siloxy and amine groups reactive with hydroxyl groups on said pre-hydrophobated precipitated silica, and
           (b) about 10 to about 50 phr of a second functionalized styrene/butadiene elastomer containing functional groups comprised of siloxy and thiol groups reactive with hydroxyl groups on said pre-hydrophobated precipitated silica, and
       (2) about 8 to about 35 phr of cis 1,4-polybutadiene,
       (3) from about 8 to about 35 phr of 3,4-polyisoprene, and
       (4) optionally from about 8 to about 30 phr or cis 1,4-polyisoprene,
   (B) about 10 to about 170 phr of particulate reinforcing filler comprised of pre-hydrophobated precipitated silica where said precipitated silica is pre-hydrophobated by reaction with at least one of alkoxyorganomercaptosilane and bis(3-triethoxysilylpropyl)polysulfide having an average of from about 2 to about 4 connecting sulfur atoms in its polysulfidic bridge, wherein said reinforcing filler contains less than about 12 phr of rubber reinforcing carbon black, and (C) about 0.1 to about 10 phr of pre-formed zinc salt of fatty acid soap.

2. The tire of claim 1 wherein said pre-formed zinc salt of fatty acid soap is provided exclusive of zinc oxide.

3. The tire of claim 1 wherein the pre-formed zinc soap of fatty acid is provided together with from about 1 to about 3 phr of zinc oxide.

4. The tire of claim 1 wherein said 3,4-polyisoprene rubber has microstructure comprised of about 50 to about 70 percent isomeric 3,4-polyisoprene, about 30 to about 40 percent of isomeric cis 1,4-isoprene, and about 5 to about 10 percent isomeric vinyl 1,2-isoprene.

5. The tire of claim 1 wherein said alkoxyorganomercaptosilane is comprised of at least one of triethoxy mercaptopropyl silane, trimethoxy mercaptopropyl silane, methyl dimethoxy mercaptopropyl silane, methyl diethoxy mercaptopropyl silane, dimethyl methoxy mercaptopropyl silane, triethoxy mercaptoethyl silane and tripropoxy mercaptopropyl silane.

6. The tire of claim 1 wherein said diene-based elastomer further includes at least one additional elastomer comprised of at least one polymer of at least one of isoprene and 1,3-butadiene and styrene with at least one of isoprene and 1,3-butadiene.

7. The tire of claim 6 wherein at least one of said additional diene-based elastomers is a functionalized elastomer which is end-chain or in-chain functionalized with at least one functional group comprised of siloxy and at least one of amine and thiol groups.

8. The tire of claim 1 wherein at least one of said styrene/butadiene elastomers is a tin or silicon coupled elastomer.

9. The tire of claim 7 wherein at least one of said additional elastomers is a tin or silicon coupled elastomer.

10. The tire of claim 1 which contains cis 1,4-polyisoprene rubber.

11. The tire of claim 1 wherein sapid tire is a sulfur cured tire.

12. The tire of claim 2 wherein said tire is a sulfur cured tire.

13. The tire of claim 3 wherein said tire is a sulfur cured tire.

14. The tire of claim 4 wherein said tire is a sulfur cured tire.

15. The tire of claim 5 wherein said tire is a sulfur cured tire.

16. The tire of claim 6 wherein said tire is a sulfur cured tire.

17. The tire of claim 7 wherein said tire is a sulfur cured tire.

18. The tire of claim 8 wherein said tire is a sulfur cured tire.

19. The tire of claim 9 wherein said tire is a sulfur cured tire.

* * * * *